United States Patent [19]

Bowling et al.

[11] Patent Number: 5,033,112

[45] Date of Patent: Jul. 16, 1991

[54] CLOSED LOOP, PROGRAMMABLE POWER AND COMMUNICATION SYSTEM

[75] Inventors: Geoffrey N. Bowling, Kanata; John C. Goodwin, Ottawa, both of Canada

[73] Assignee: Northern Telecom Limited, Montreal, Canada

[21] Appl. No.: 131,840

[22] Filed: Dec. 11, 1987

[30] Foreign Application Priority Data

Jul. 13, 1987 [CA] Canada ............................ 542091

[51] Int. Cl.$^5$ ............................................ H04B 10/12
[52] U.S. Cl. ............................ 455/603; 340/310 CP; 455/612; 455/617
[58] Field of Search ........ 340/310 CP, 310 A, 310 R; 455/600, 603, 605, 612, 606, 607, 617; 370/3

[56] References Cited

U.S. PATENT DOCUMENTS

| | | | |
|---|---|---|---|
| 4,081,208 | 3/1978 | Meade | 350/96.20 |
| 4,215,276 | 7/1980 | Janeway | 340/310 A |
| 4,373,777 | 2/1983 | Borsuk et al. | 350/96.20 |
| 4,449,043 | 5/1984 | Husbands | 250/205 |
| 4,465,333 | 8/1984 | Caserta et al. | 350/96.20 |
| 4,491,387 | 1/1985 | Dey et al. | 350/96.23 |
| 4,552,432 | 11/1985 | Anderson et al. | 350/96.23 |
| 4,568,145 | 2/1986 | Colin et al. | 350/96.20 |
| 4,659,176 | 4/1987 | Mori | 350/96.18 |

(List continued on next page.)

FOREIGN PATENT DOCUMENTS

| | | | |
|---|---|---|---|
| 1116714 | 1/1982 | Canada | 340/79 |
| 1179032 | 12/1984 | Canada | 340/79 |
| 1190675 | 7/1985 | Canada | 363/10 |
| 1192260 | 8/1985 | Canada | 325/1 |
| 1194164 | 9/1985 | Canada | 340/70 |
| 1199074 | 1/1986 | Canada | 325/1 |
| 1199972 | 1/1986 | Canada | 325/1 |
| 1200844 | 2/1986 | Canada | 325/1 |
| 1201170 | 2/1986 | Canada | 325/1 |
| 1201484 | 3/1986 | Canada | 325/1 |
| 1201485 | 3/1986 | Canada | 325/1 |

(List continued on next page.)

OTHER PUBLICATIONS

EPRI Journal Nov. 1986, "The Smart House: Wired for the Electronic Age".
Electrical Equipment News—Mar. 1987, "Smart House is Tops in Technology".
Electronics—Jul. 1985, "Will Smart House Provide Shelter for High-Tech Firms?"
Professional Builder—Dec. 1986, "Smart House—Most Revolutionary Change in Housing Since Indoor Plumbing".
Closed Loop Programmable Power—A Smart House Innovation John A. Edgar—presented in Stockholm Jun. 1987.

Primary Examiner—Reinhard J. Eisenzopf
Assistant Examiner—L. Van Beek
Attorney, Agent, or Firm—Scott & Aylen

[57] ABSTRACT

A power and communication system for a building, and particularly a residential dwelling wherein there are provided a plurality of receptacles throughout the building, each connected by a cable to source, which may provide different voltages and either AC or DC and having a control interface for selectively switching the desired power to each cable individually. The control interface may also connect each cable to a selected signal transmission line, such as telephone, radio, TV, etc. The cable includes a pair of power conductors and a optical fiber which transmits to and receives from the control interface light signals informing the control interface what power or communication connection is required for a particular receptacle and possibly at the same time providing signal messages to each receptacle. The single optical cable can transmit an interrogating signal to the receptacle, which signal is transferred through a special plug and socket connection have a mating optical coupler to an appliance equipped with a microprocessor programmed for replying by way of light signals sent back to the interface through the same coupler and optical fiber. The control interface is thus informed as to what power and communication connections the appliance requires and to how the appliance should be subsequently monitored.

24 Claims, 10 Drawing Sheets

U.S. PATENT DOCUMENTS

| | | | |
|---|---|---|---|
| 4,690,491 | 9/1987 | Stein et al. | 350/96.16 |
| 4,755,792 | 7/1988 | Pezzolo et al. | 340/310 |
| 4,767,181 | 8/1988 | McEowen | 350/96.21 |
| 4,782,322 | 11/1988 | Lechner | 340/310 CP |
| 4,782,482 | 11/1988 | Kiatipov | 340/310 A |
| 4,803,632 | 2/1989 | Frew | 340/310 A |
| 4,808,841 | 2/1989 | Ito | 340/310 A |

FOREIGN PATENT DOCUMENTS

| | | | |
|---|---|---|---|
| 1202081 | 3/1986 | Canada | 325/1 |
| 1208293 | 7/1986 | Canada | 324/74 |
| 1210815 | 9/1986 | Canada | 325/1 |
| 1210816 | 9/1986 | Canada | 325/1 |
| 1220848 | 4/1987 | Canada | 350/24 |
| 60-157344 | 8/1985 | Japan | 455/612 |
| 1429843 | 3/1976 | United Kingdom | |

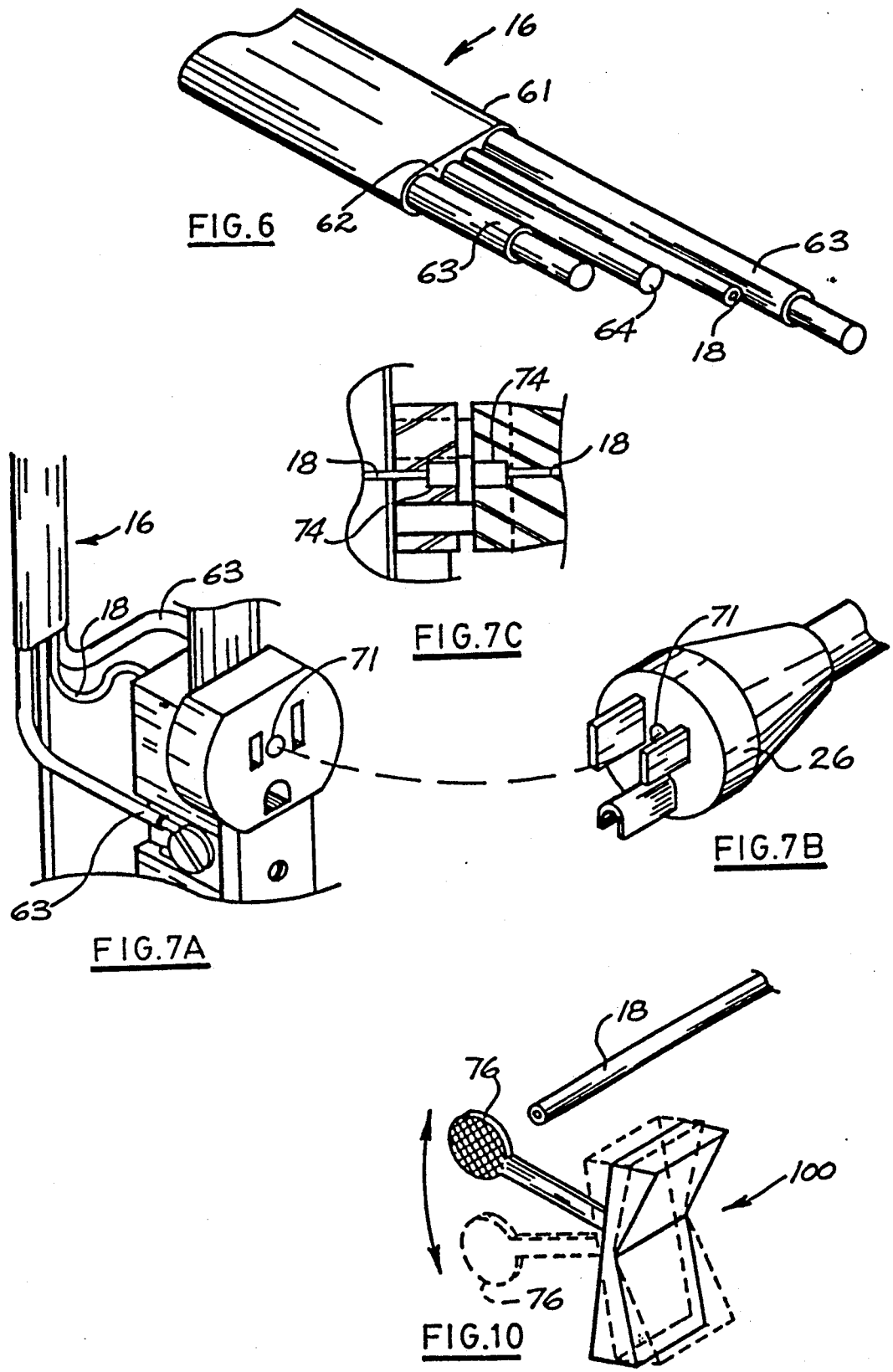

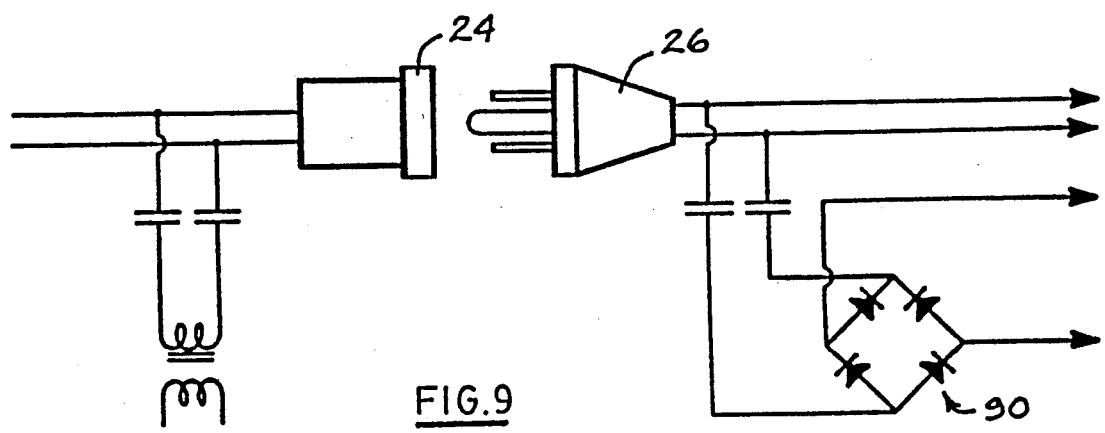
FIG.9
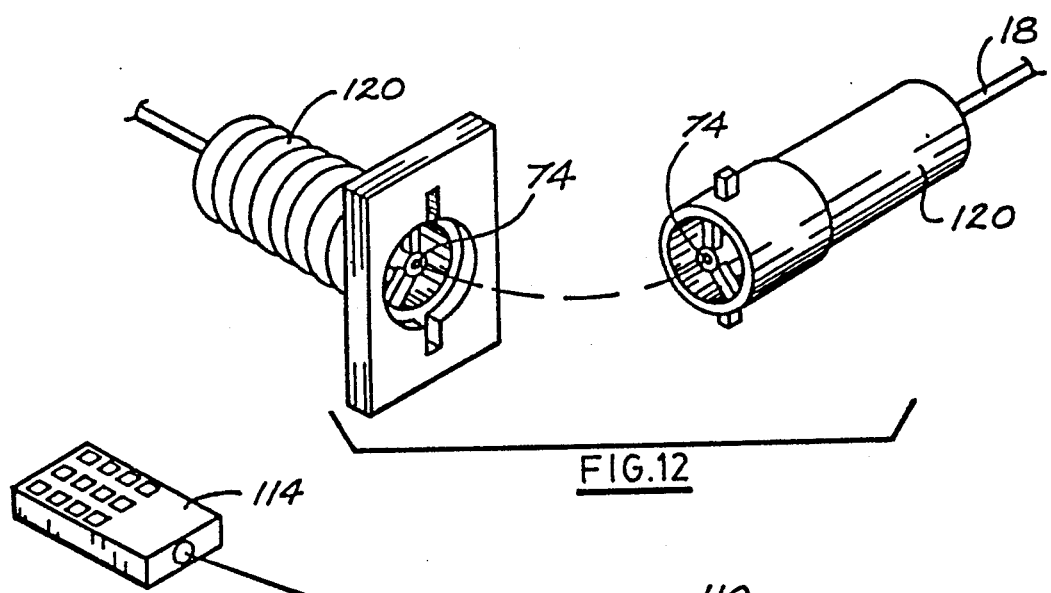
FIG.11A
FIG.11B
FIG.11C
FIG.12

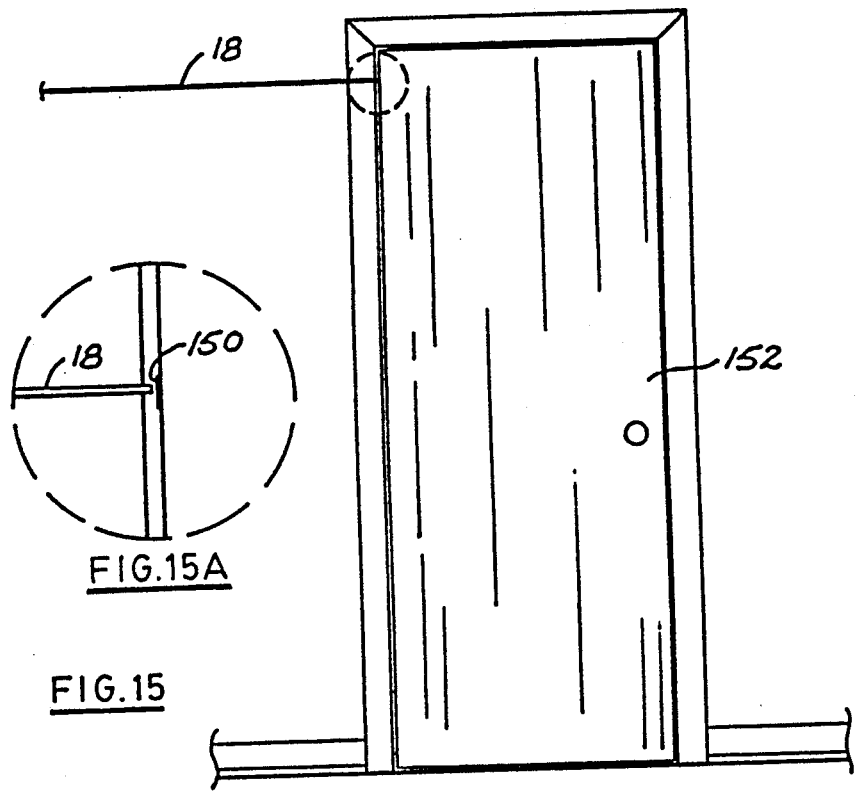
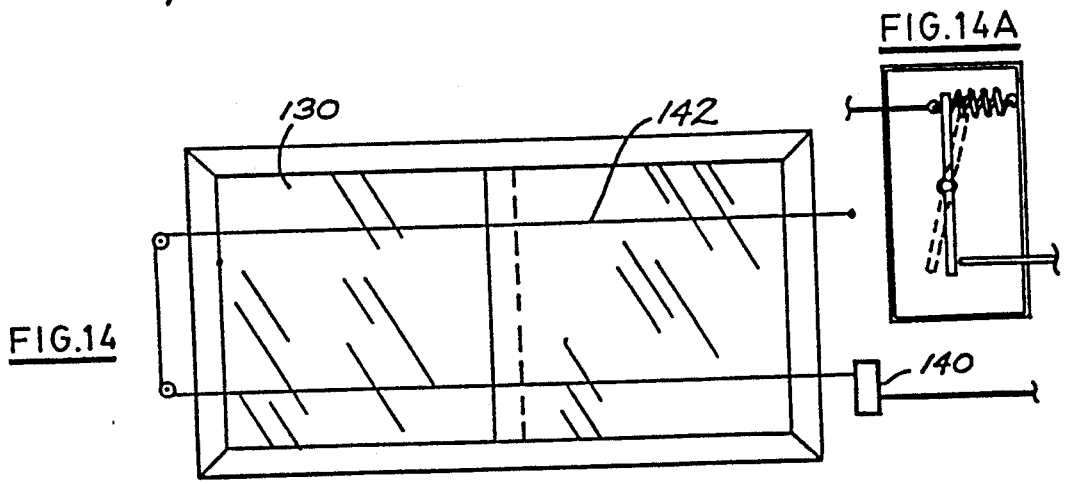
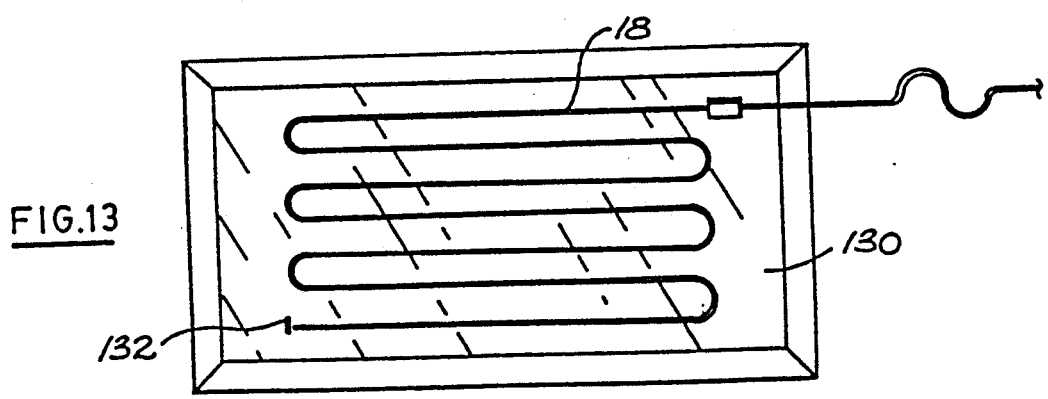

CLOSED LOOP, PROGRAMMABLE POWER AND COMMUNICATION SYSTEM

BACKGROUND OF THE INVENTION

1. Field of the Invention

This invention relates to closed loop, programmable power and communication system for buildings, and particularly for use in residential dwellings. The closed loop programmable power concept relies on two way communication between a central power developing system and power operated devices, such as domestic appliances, connected to the system. More particularly, the invention relates to a system wherein the communication link is integrated with the power cable, the communication link being an optical fiber.

2. Description of the Prior Art

The concept of closed loop programmable power is a spin off of research work in the United States directed to the development of a home of the future that combines the centralized microprocessor controls of building systems and household appliances with the unified distribution of power and communications. According to the National Electrical Code of the United States, closed loop and programmed power is defined as a premise power distribution system jointly controlled by a signalling between the energy controlling equipment and the utilization equipment. This concept may be applied to a residential environment by having power outlets and associated branch circuits maintained in a de-energized state unless called upon to feed an appliance connected to the home's power distribution network. The appliance would have to identify itself and communicate its power requirements and operational parameters to a power system controller in order to qualify for the receipt of power. These requirements would be unique to a particular appliance and would be encoded on a micro chip built into the appliance. Any irregularities sensed by the controller would consequently prevent the device from receiving power. On the basis of closed loop power distribution, the appliance would be expected to communicate its power requirements as well as unique operational parameters to the control system and this communication would continue during operation. Any deviation from the specified requirements would be communicated immediately to the controller and if the deviations indicated a malfunction, power would be removed from the appliance. Malfunctions such as excess current requirements, signalling defective equipment or short circuit in the equipment itself or the power cable leading to the equipment would be reported to the power controller and power removed from the circuit. Similarly, objects accidentally or intentionally placed in an outlet would not communicate power requirements to the power controller and the outlet would remain de-energized. Electrocution, which is a major home safety problem, would be significantly reduced. The occurrence of electrically generated house fires caused by short circuited wiring would also be reduced.

According to the proposed system, a residence would be provided from an external source with the normal power supplied by the utility service, and a power panel in the residence has an output with a range of voltage and line frequency capabilities, e.g. 60 Hz 120 volts: 60 Hz 220 volts: 400 cycle 120 volts and 48 volt DC. Hence, a range of appliances having different voltage and line frequency requirements could be coupled to a standard power socket. This would lead to the development of a range of appliances using 48 volt DC motors for appliances such as washing machines, dryers, electric drills, etc. The utilization of DC motors would eliminate the requirement for expensive belt or gear drive arrangements.

It is further contemplated that the proposed loop system would provide in an integrated system, access to external communications networks such as telephone, cable television, FM broadcast, as well as remote monitoring facilities. Under the proposed systems, the power outlets in the residence would include sockets for receiving operating power as well as an arrangement of sockets adapted to provide the communication link between an appliance to be plugged therein and the central power controller. The central power controller which will connect the external power source to the residence will be controlled by an interface which will receive communications information from the appliance plugged into the socket. The interface will interrogate the appliance, assess power requirements, instruct the power controller to deliver the required output, and to continually monitor operation of the appliance. In the proposed system, the communication link comprises a plurality of copper conductors integrated with the power cable or connected in parallel thereto.

A central distribution panel will, in addition to receiving external power, also receive external communication inputs which will be distributed to local interface networks within the residence. Certain appliances will be dedicated such as dryers and stoves and these appliances will be connected directly to the central distribution system. Other lower power requirement appliances such as televisions, radios, etc. will share power from the localized interface networks. It will be apparent to one skilled in the art that the use of copper as a communication link has some limitations. For example, EMI/RFI interference, unless elaborate shielding techniques were employed, would adversely effect the quality of audio and video signals. Considering the large number of potential communication links, a large number of copper wires, up to 25, could be required. In view of the specialized communication interconnections, a specialized plug and socket system and the associated hardware and outlet boxes would be required.

SUMMARY OF THE INVENTION

The purpose of this invention is to provide a system which combines all of the aforementioned advantages associated with closed loop programmable power without the limitations introduced by the copper communication links. This is accomplished by replacing the copper with a single optical fiber through which there can be two way communication between the various power distribution centers and the appliances associated therewith. The fiber optic cable concept, additionally, provides the medium whereby in addition to closed loop power various communications, both internal and external are available through the residence. These and other features of the invention are accomplished by providing a closed loop, programmable power and communication system for a building having a power source, a control interface means, a plurality of receptacle means throughout the building at locations where power is required, and a plurality of power distribution cables extending one each from the power source to the receptacles. Each cable includes a pair of electrical power conductors and an optical fiber for transmitting light simultaneously in both directions between the interface means and each receptacle. Each receptacle has a signal receiving and transmitting means in communication with the optical fiber of the cable extending thereto. The control interface has means for transmitting signals to the optical fiber of each cable and receiving signals therefrom. The system further includes switching means controlled by the interface in response to signals received thereby for controlling power flow from the power source to the power conductors of each cable.

BREIF DESCRIPTION OF THE DRAWINGS

Specific embodiments of the present invention will now be described in detail with reference to the appended drawings wherein:

FIG. 6 illustrates a power cable with integrated optical fiber;

FIG. 7A is a plug according to the present invention;

FIG 7B is a receptacle according to the present invention;

FIG. 7C is a cross-sectional view of a plug-receptacle pair including receiving and transmitting means;

FIG. 9 shows schematically a power supply to an appliance microprocessor;

FIG. 10 is a perspective view of a switch according to the present invention;

FIGS. 11A-11C illustrates a sensor and remote signally means;

FIG. 12 illustrates an further application in accordance with the present invention; and FIGS. 13,14, 14A and 15 and 15A illustrate further embodiments of the invention.

DESCRIPTION OF PREFERRED EMBODIMENTS

Figure 1:
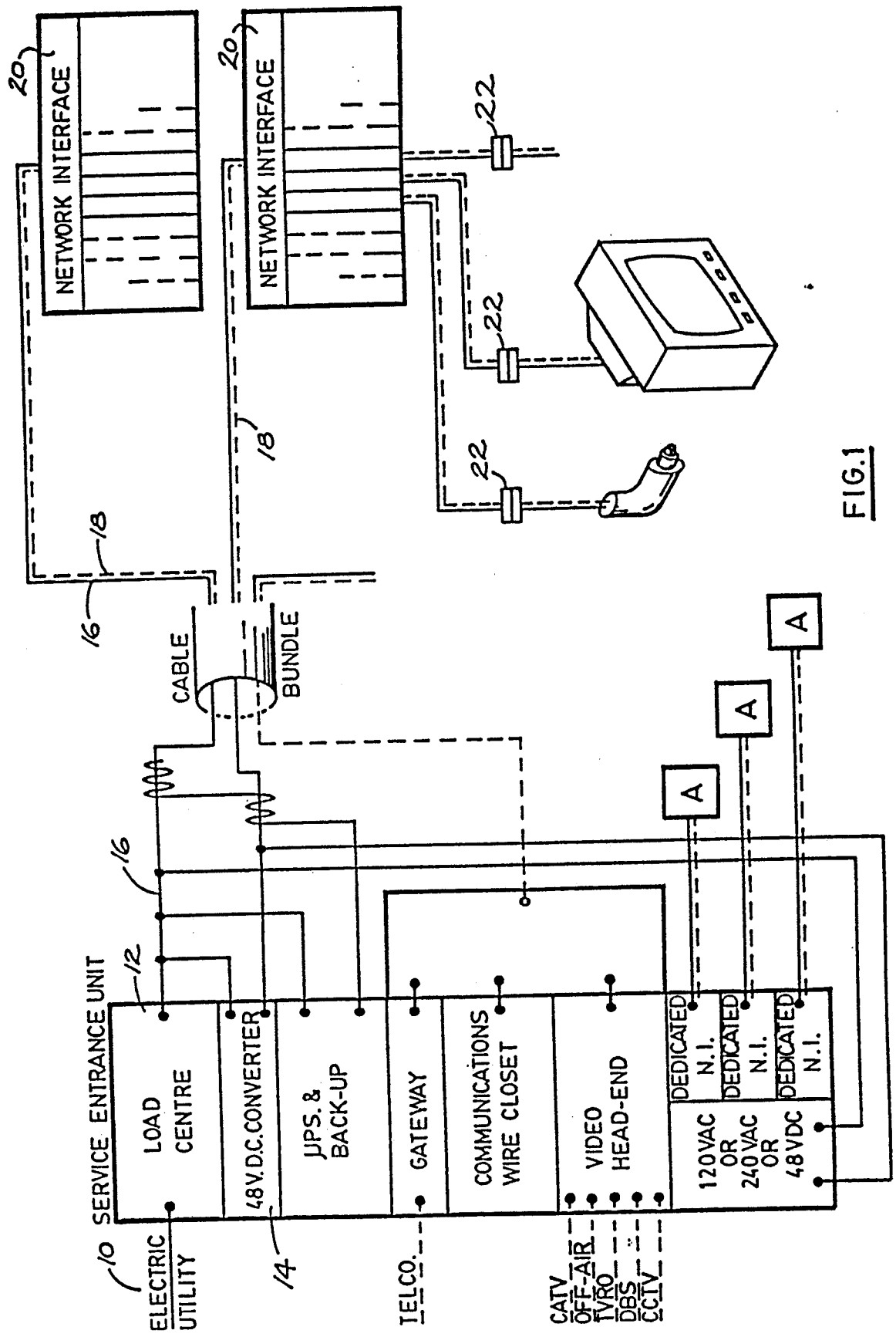
FIG. 1 shows schematically a simplified closed loop programmable system according to the present invention.

Referring initially to FIG. 1, a simplified overview of the system according to the invention illustrates mains voltage 10 from the utility service introduced to the building (not shown) at the load centre 12. In addition to the normal 110 volt, 60 Hz. the load centre or power source means is adapted to deliver 48 volts D.C. from a 48 V. DC converter 14. In accordance with the invention both of these voltages are available for distribution over a pair of electrical power conductors included in the power distribution cables 16 shown in solid line in FIG. 1. Also included in the distribution cable is an optical fiber 18 shown in dotted line running in parallel with the electrical power conductors. As illustrated the distribution cable 16 interconnects the power source 12 to the control interface 20 from which the distribution cable 16 extends to a plurality of power receptacles 22. Each receptacle 22 connected to the control interface 20 has in addition to a power delivery socket 24 a coupler 74 as best seen in FIG. 7C, capable of receiving a signal from the optical fiber 18 and transmitting a signal back to the optical fiber 18. The plug 26 mating with the socket 24 and attached to the appliance 28 for delivering power thereto also may include a coupler 74 connected to an optical fiber 18 which runs in parallel with power conductors to the appliance. Appliances in accordance with the invention may be provided with a pre-programmed microprocessor (not shown) which includes operational data specific to the appliance. When an appliance 28 is plugged into the socket 24 the control interface 20 transmits via the optical fiber 18 a light wave interrogation signal to the microprocessor. The interrogation signal is processed by the microprocessor and in response thereto returns a light signal via the optical fiber 18, which signal includes operational data such as voltage requirements, current range, operating frequency and operating temperature. The control signal from the microprocessor in the appliance 28 is assessed by the control interface 20 and if the data is within the specified conditions for that appliance the control interface 20 will, via the optical fiber 18, direct the power source 12 to provide the requested power to the appliance 28. The power source 12 includes switch means 15 which in response to a command signal from the control interface 20 selects the appropriate power from the bank of available power ranges in the power source. Thus, if the appliance 28 calls for 48 volts DC the switch means 15 will connect the appliance 28 to the 48 volt DC power source. Once having received the requirements of the appliance, the flow of power is continuosly monitored to that particular cable, and if the draw of power deviates form the specified conditions, the power for the cable is switched off, and for example an alarm might be given.

Generally, the receptacle 22 is referred to throughout the description as being an outlet box of the type containing a socket, but the term is meant to cover other electrically connected devices which are permanently wired fixtures, such as lights.

As an alternative to the above-described arrangement, it is possible to utilize, instead of a continuosly transmitted interrogating signal, a system in which the appliances are equipped with means to transmit the initial signal to the interface when first connected or activated by the user.

The system may include a single control interface, or a plurality of control interfaces, which are connected to a central control and distribution panel, may be used, depending on the power requirements of the building. As illustrated in FIG. 1 appliances 30 such as cooking stoves or clothes dryers have dedicated interfaces 32 which instruct the power source to deliver operational power responsive to an interrogation enquiry.

FIG. 1 also illustrates a service entrance 40 adapted to receive various external communication networks for distribution within the building. Included in the group of external communications for distribution within the building are telephone, CATV, and FM/AM radio.

Figure 2:
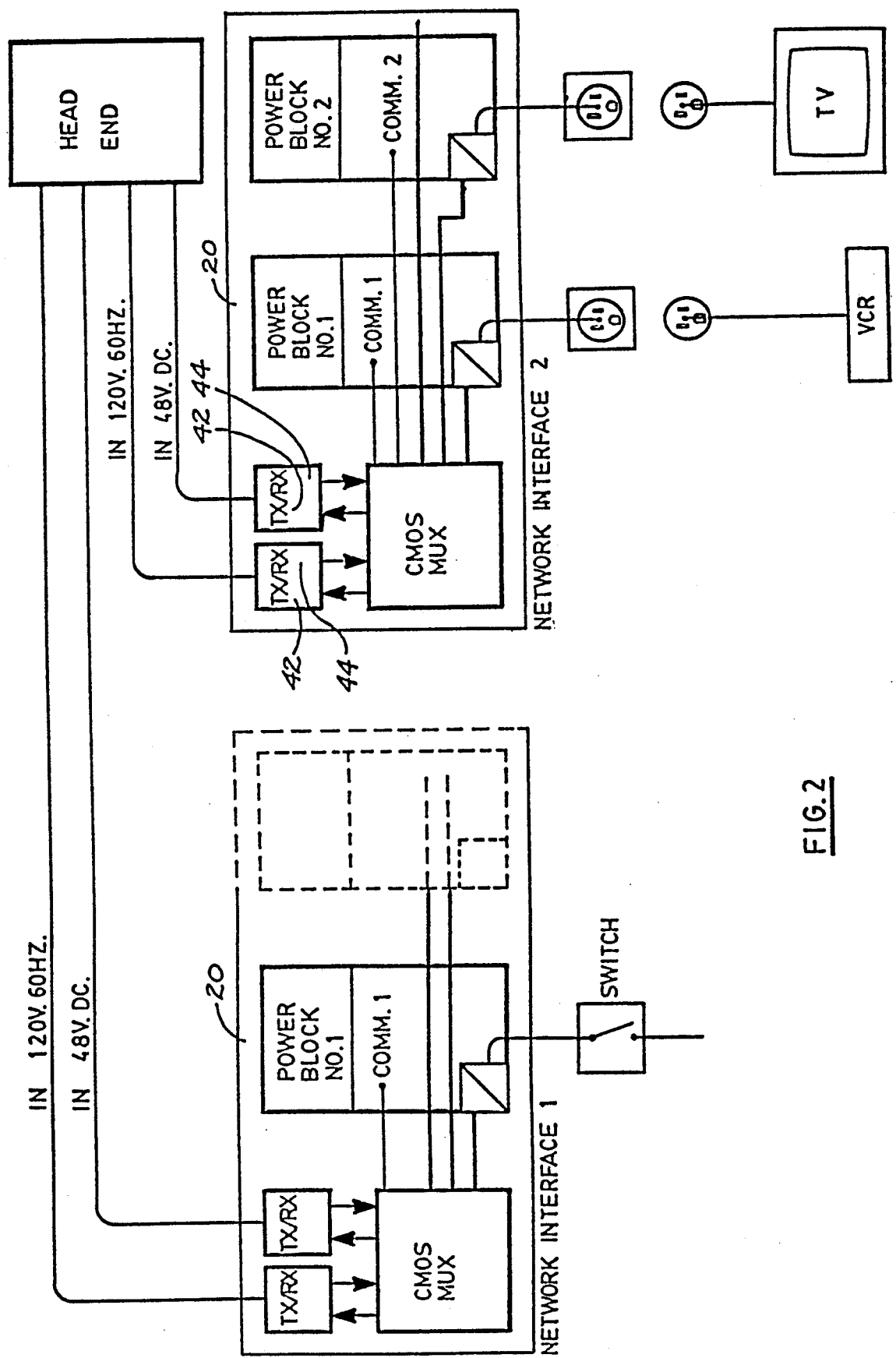
FIG. 2 is a block diagram of a power source and interface.

FIG. 2 illustrates control interface units 20 in greater detail. 120 volt 60 Hz and 48 volt DC power is available for delivery to the control interface. Transmitting means 42 and receiving means 44 in the control interface continuously receive and transmit signals from the plug/receptacle pair to the power source and the power source delivers power to the receptacle/plug pair in response thereto.

Figure 3:
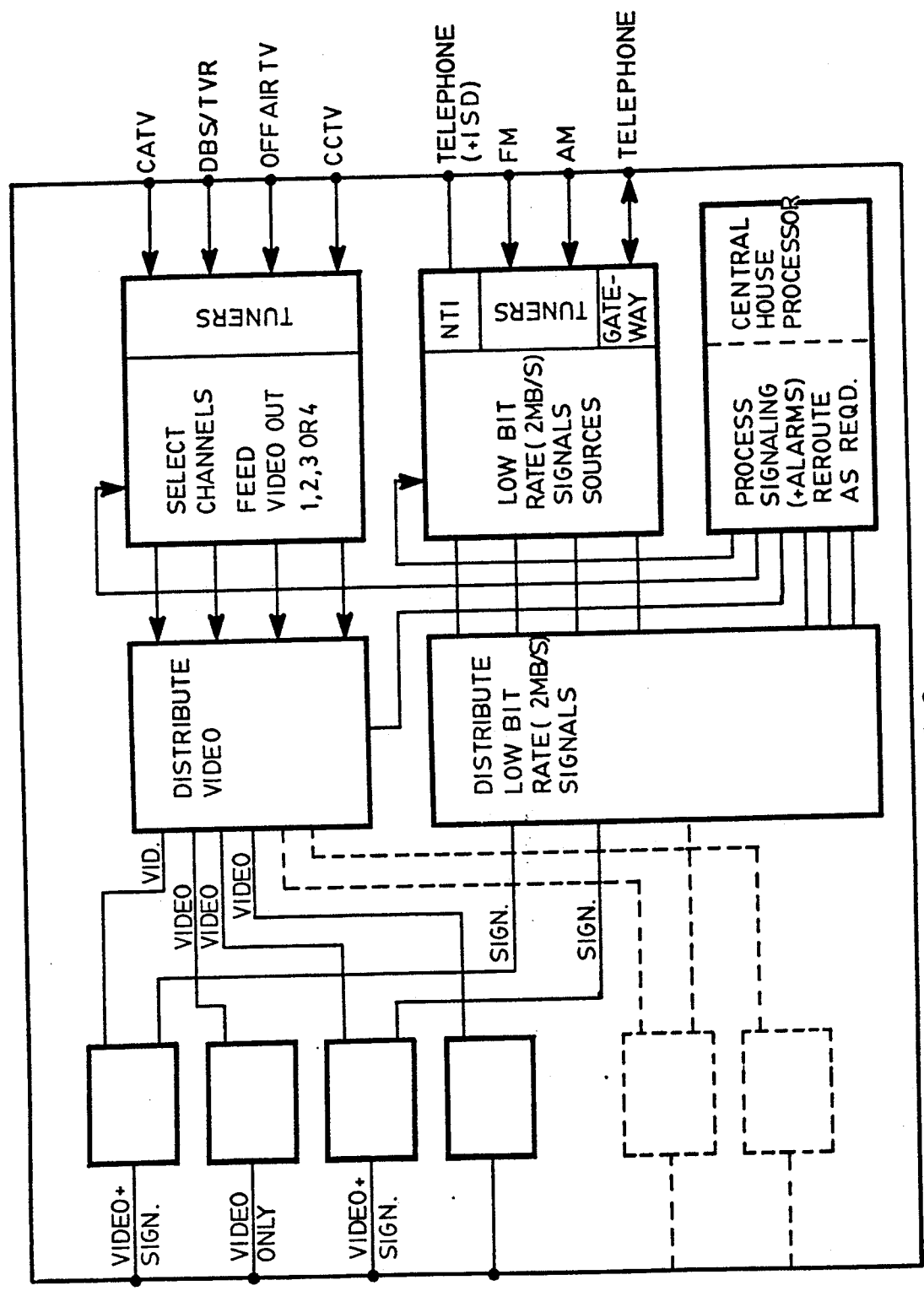
FIG. 3 is a block diagram of a head end of a communication system according to the present invention.

FIG. 3 illustrates the communication distribution network in accordance with the invention. The external communication signals brought into the building may be converted to digitized light signals and are distributed to receptacles via the optical fiber. The appliance connected to the receptacle is adapted to convert the optical signal to an electrical signal for processing by the appliance. It is to be understood that such appliances include telephone, radio, television and monitoring equipment. The optical fiber carries the communication signal, video, for example, and a command signal or information pertaining to the video signal i.e. to which receptacle the signal is to be directed and what channel is required. It is to be understood that although in the illustrated example of the present invention, reference is made to use of digitized light signals, it is entirely possible to alternatively use analog signals, and accordingly, the use of analog light signals in the communication conducted within the optical fiber should always be considered to be an obvious equivalent.

Figure 4:
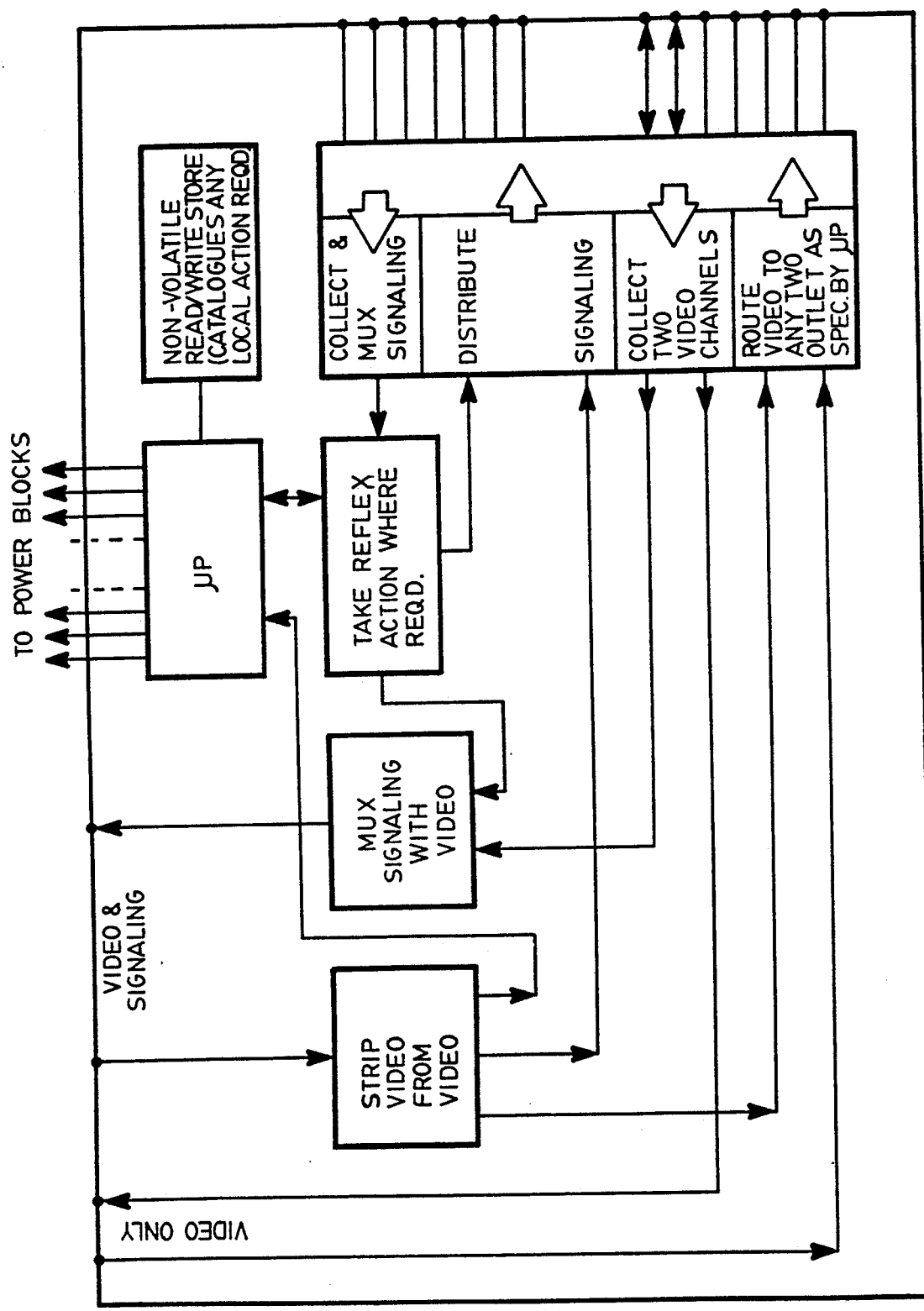
FIG. 4 is a schematic representation of the multiplexing network.

As discussed previously, each appliance is provided with a microprocessor, which has stored in a permanent memory, operational information such as voltage, frequency, timing and current requirements. When the appliance is connected to a socket, the communication link between the microprocessor and the interface network is completed through the optical fiber communication link and an interrogating signal is coupled from the interface to the appliance. The microprocessor has associated therewith a converter to convert the light signal to an electrical signal which is processed by the microprocessor. In response to the interrogation signal, the microprocessor instructs the converter to convert its electrical output to a light signal which is then relayed as operating data back to the interface via the optical fiber and this information is in turn communicated to the power distribution network. Power in accordance with the operational data is supplied to the appliance and continues to flow thereto until instructions are given to discontinue operation. Unplugging the appliance breaks the communication link provided by the optical fiber and the socket becomes deenergized. Similarly, a malfunction in the appliance will result in a communication signal which is outside of the operating range and this signal will instruct the power distribution network to cease power flow to the affected appliance. Similarly, communications in the form of cable television or telephone, etc. is available at the distribution panel and will be connected to the socket upon receipt of the appropriate instructions responsive to an interrogation signal fed to an appliance coupled to the socket. The interconnection of the communication and power sources are illustrated in FIGS. 2 through 4.

Figure 5:
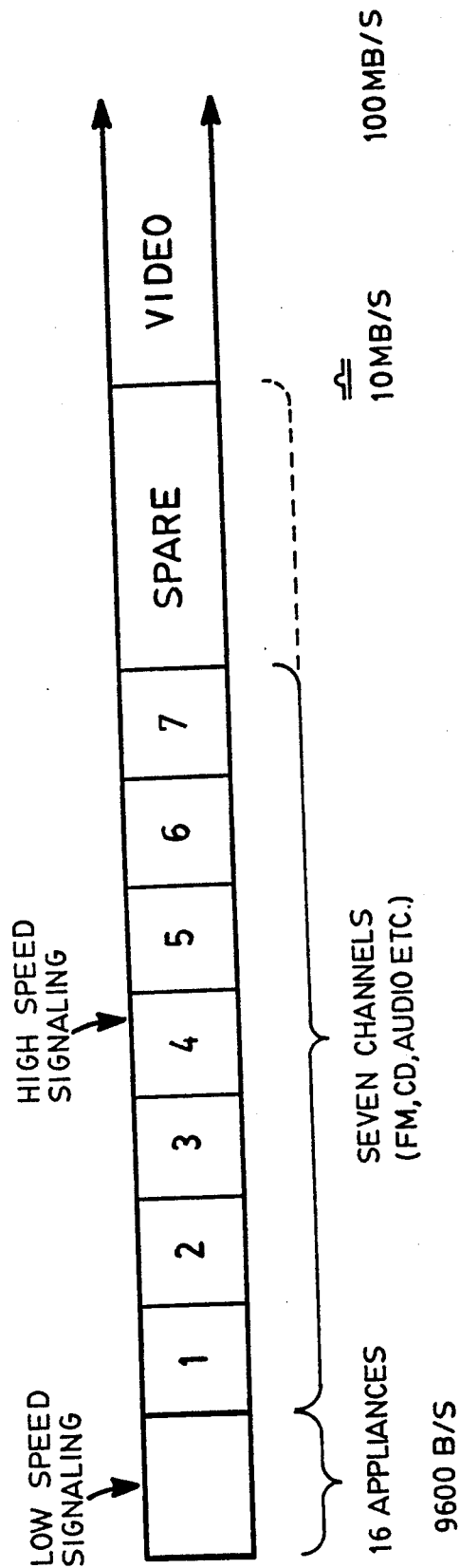
FIG. 5 shows pictorially the data base frequency range.

FIG. 5 illustrates the range of frequency used in the optical fiber communication link and which will accommodate the various communication requirements within the residents. The lower range, which may be 4800 bits per sec., for example, will be reserved for interrogation and reply communication respecting appliances and the higher ranges, which may be 90 megabits per sec., or even as high as 450 megabits per sec., will be reserved for external communication, audio, and video signals.

Turning now more specifically to components which will be required to facilitate the closed loop programmable power system including an optical fiber integrated with the electrical power conductors of a power distribution cable.

FIG. 6 is an illustration of one example of a power cable of the type which might be used in the closed loop programmable power system. The cable 16 is shown as being flat in accordance with normal domestic wiring and includes an outer cover 61, internal insulation 62 and two insulated conductors 63. A ground wire 64 is also shown. A single glass or plastic optical fiber 18 is incorporated into the normal electrical wiring cable, this fiber being included at the time of manufacture. For certain special installations in which special requirements for the transmission of communication signals, more than one optical fiber may be included in the cable. The fiber is capable of withstanding temperature variations which are found in a residential environment. The fiber is also capable of being bent so as to be compatible with normal house wiring techniques. One technique which may be used to prevent the optical fiber from being bent too sharply when the cable is being drawn during installation, is to include in the cable a continuous tube which has an internal diameter considerable larger than the outside diameter of the optical cable, and the optical cable is contained loosely in the tube.

In conventional house wiring, it is common practice to utilize having three power conductors for the purpose of reducing the number of cables required in including the known types of on/off switches in, for example, circuits including lights, but this practice would be less necessary in the circuitry of the present invention in as much as signal information for use in switches, such as wall switches, is transmitted by the optical cable as will be described later. It is contemplated, however, that in accordance with the invention all power distribution cables as presently used, regardless of the number of power conductors contained therein, can be configured to include one or more optical fiber within the cover.

As shown in FIG. 7A, and FIG. 7B the plug/socket pair for use with the closed loop programmable system is compatible with plugs and sockets currently in use. The only modification that is required involves the positioning of a centrally disposed opening in the body of the plug and socket to accommodate the optical fiber and the optical coupler in the mating faces. The lens may be molded into the plastic portions of the socket and plug elements during manufacture.

Since the fiber, which is used in this application, has a small diameter 0.1 millimeters or less, it is necessary to incorporate optical couplers in the plug and socket pair to relieve tolerance requirements and to ensure proper communication coupling. For this purpose, a beam expanding lens 74 compatible with the fiber cable 18 and the environment is secured to the end of one or both cables in the plug receptacle pair as shown in FIG. 7C. The lens system receives light exiting one of the fibers and directs it to the mating fiber. With the aid of such a coupling system, some mechanical tolerances are relaxed and a plug and socket pair analogous to those currently used in residential installations can be utilized without the need for elaborate aligning procedures.

More specifically, it is preferable to provide a collimating coupler lens so that there will be relatively low loss coupling between fibers, in spite of mechanical tolerances which are practical in the mating of a simple plug and socket combination. End to end coupling directly between bare fiber ends is relatively insensitive to tilt in the relative axis of the two fibers, but due to the small diameters of the fibers, such a coupling is very sensitive to lateral shifts. However, a feature of a mating plug and socket is that it is fairly controlled with respect to being angled, say 2° for an economical, but well designed, combination, but has a considerable amount of uncontrolled lateral shift, say 0.01" or 250 microns. Accordingly, the presence of a lens or lenses seems necessary to ensure the transmission of a signal through the connection formed by the plug and socket.

The working lens radius is $$r = f \times NA,$$

where f is the focal length of the lens, and NA is the numerical aperture, a measure of the angular spread of the light leaving a fiber; and it is necessary that r is greater than 0.01" to be able to withstand lateral shifts of the two couplers.

Thus, it follows that $f \times NA$ is greater than $250\mu$ is one condition, which prefers a large f.

A relative tilt of the two coupler lenses will result in a lateral shift of the one fiber core image overlapping the other fiber. This shift is $f \times \theta_{tilt}$ and should be less than the fiber core radius for low loss. Thus the other lens constraint is that $$f \times \tan\theta_{tilt} < \tfrac{1}{2} \text{ of 62.5 microns,}$$

as 62.5 microns is a typical and commercially available optical fiber.

$$\tan 2° \simeq 0.03.$$

therefore, it is necessary that f be less than $30 \mu/0.03$, or that $$f < 1 \text{ mm.},$$

i.e., a small f is preferred.

Accordingly, taking into account the preference of the previous calculation that $f > 250\mu/NA$, i.e., that $f > 1$ mm., the two conditions strongly dictate that $f = 1$ mm. as the optical focal length for a low loss in the plug-socket mating. Even with this selection, the loss may still be substantially, (perhaps several decibels) and this would have to be taken into account in the design of the intensity requirements of the signals being transmitted. It is felt that probably for acceptable operation, outside limits on the focal length dimension, taking into account typical mechanical tolerances and optical fiber characteristics, are likely ⅓ mm. to 3 mm.

Figure 7D:
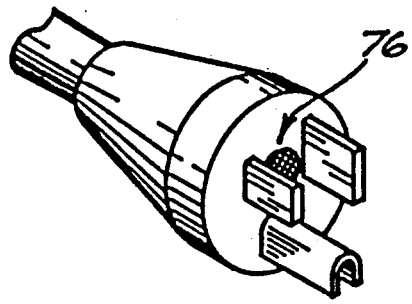
FIG. 7D illustrates a plug which is provided with retroreflective means.

It is anticipated that new house construction built in accordance with the closed loop programmable power system will be equipped with a universal plug and socket pair complete with optical coupler. Since a home owner moving into such a house may not have a full range of appliances having programmed microprocessors, there is a need to adapt the system to accommodate appliances without microprocessors. In accordance with the present invention, the plug of an appliance without microprocessor is fitted with a retroreflective attachment 76 at the location which otherwise would be occupied by an optical coupler in a plug of a microprocessor equipped appliance as shown in FIG. 7D and this retroreflective material serves to reflect the interrogating signal provided by the interface back to the source. The reflected interrogation signal serves to notify the control interface that an appliance without facility to provide operational parameters has been connected to the system and the control interface will instruct the power source to provide the default power which will usually be 110 volts, 60 Hz. to the socket. Thus, an appliance which does not have a microprocessor, and is not otherwise operational in a closed loop system, can be energized.

Figure 7E:
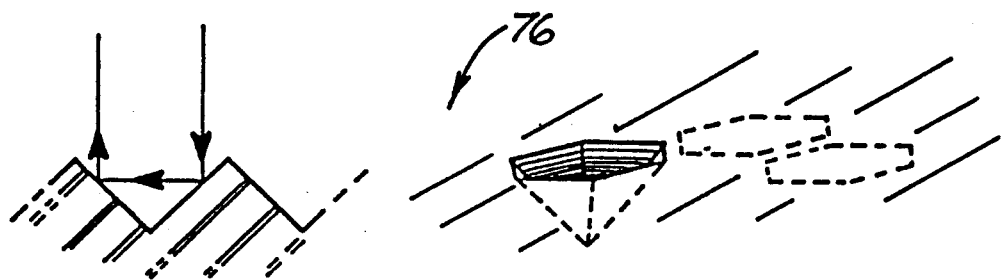
FIG. 7E is an enlarged view of the retroreflector of FIG. 7D.

The retroreflective material to be used on the appliance plug should be capable of returning the incident light energy coaxially. Thus, light which might be reflected accidentally as from a mirror, reflecting magnetic surface, toys, etc. would not provide an error signal to the interface. One particularly efficient material for this purpose uses micropyramidal depressions of hexagonal form as illustrated in FIG. 7E although other configurations such as a microspheres reflector can be used.

In order to ensure the reflection of the light beam effectively, a selection of the size of the individual elements making up the reflective material, may be calculated as described below.

The offset of the return beam from the incident beam can be as large as $D_{=1}$, which is maximum dimension of the retroreflective element, and this maximum offset must be contained within the working area of the coupling lens. The normal working radius of the lens, roughly speaking, is defined by the formula $$r = f \times NA.$$

As indicated, the focal length of the lens may typically be 1 mm., and the angular spread of the light leaving a fiber, i.e., NA is approximately 0.2 or 0.3 for the type of fiber contemplated. Accordingly, D:1 should be less than $f \times NA$, or $$\begin{aligned} D_{e1} &< f \times NA, \text{ or} \\ &< 1 \text{ mm.} \times 0.3 \\ &< 300\mu \end{aligned}$$

Thus, for this consideration, a small $D_{=1}$ is better. However, it is necessary to consider diffraction loss. Due to diffraction effects, there will be an additional angular spread of light leaving the retroreflective element. The angle of diffusion, $\theta_{diff}$, is approximately equal to $\lambda/D_{=1}$, where $\lambda$ is the wavelength being used, likely $0.8\mu$. It is important that this angular spread be smaller than that angular spread present in the not perfectly collimated beam leaving the lens coupler. The collimation imperfection is due to the finite fiber core size, and $$\theta_{beam} \simeq \text{fiber radius}/f_{lens}$$

For a fiber diameter f $62.5\mu$, r approx. equals $30\mu$, and as indicated, the focal length is about 1 mm. Thus, $$\theta_{beam} = 30\mu/1 \text{ mm.}, 0.03 \text{ radian, or about } 2°.$$

As indicated, it is important that $$\lambda/D_{=1} < 0.03,$$

so, $$D_{=1} > (\lambda/0.03 = 0.8\mu/0.03 \simeq 25).$$

In other words, this consideration indicates that $D_{=1}$ must be more than $25\mu$. Looking at the two consideration, it appears, therefore, that the outer dimension of the retroreflective element is between 25μ and 300μ and an appropriate compromise is about 100μ.

To provide even further discrimination against accidental or deliberate generation of erroneous reflections, the optical axis of the couplers in the plug and socket may be slightly angled from a perpendicular to the plane surface of the plug and socket. Thus, any potentially reflecting material even placed flush against the plug face would not be normal to the optical axis and would not return the incident energy.

Figure 8A:
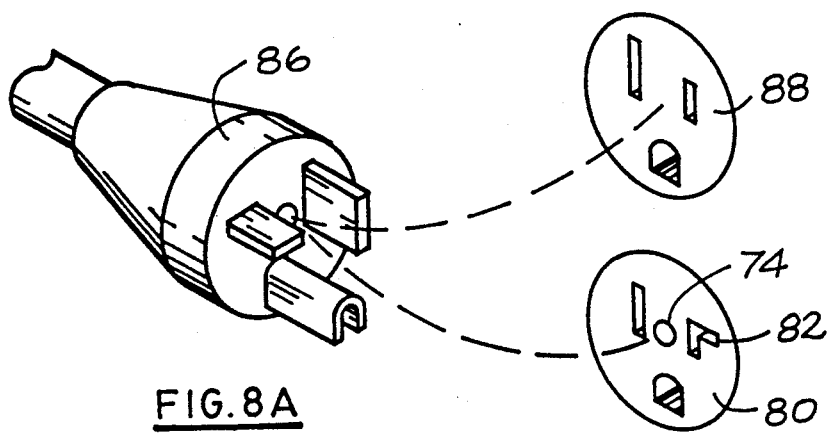
FIGS. 8A, 8B, 8C and 8D illustrate closed loop receptacles and mating plugs.

In keeping with the desire to utilize a universal plug and socket pair capable of delivering and receiving 120 or 48 volts and to allow for use of non closed looped power appliances in a residence having closed loop power capabilities, a universal socket 80 has been designed. The socket as shown in FIG. 8A through D includes in addition to the optical coupler 74 an L shaped socket 82. In FIGS. 8A, 8B, 8C and 8D the normal non closed loop power socket is shown immediately above the universal socket. In FIG. 8A, the plug 86 on the left is for an appliance requiring 48 volt DC. It can be seen that this plug will not mate with the non closed loop power socket 88 but that it will mate with the closed loop power socket 80.

Figure 8B:
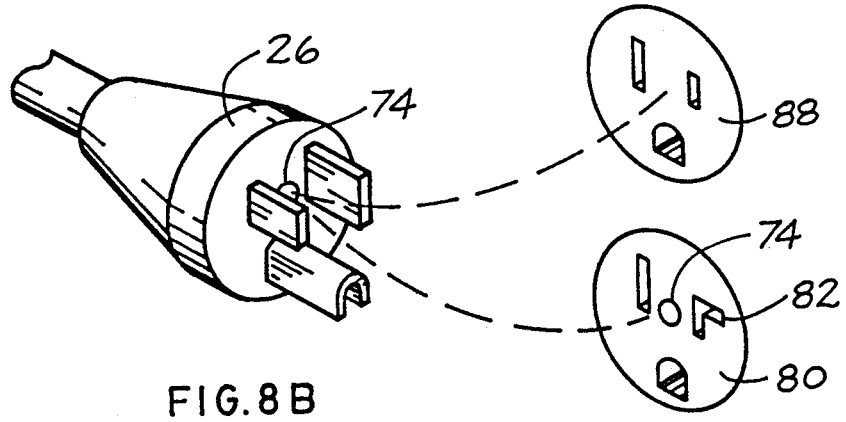
Figure 8C:
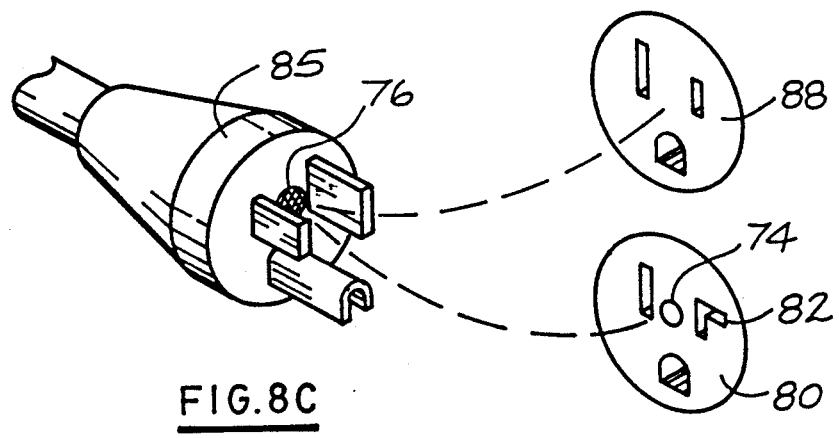
Figure 8D:
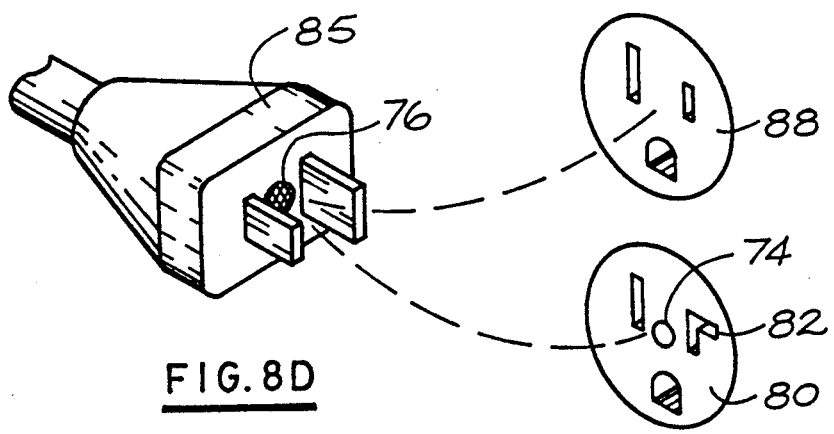

FIG. 8B illustrates a plug 26 which requires 110 volts and which is adapted for closed loop programmable power as evidenced by the optical coupler 74 in the front face. This plug 26 will be received in both of the sockets 80, 88 on the right hand side. Likewise, in FIG. 8C and 8D, the plug 85 on the left is for use by a 110 volt appliance which is not adapted for use with closed loop programmable power. Retroreflective surface 76 on the plug face reflects the interrogating signal back through the communicating fiber and the appliance will be provided with 110 volt supply. Although the socket as shown in FIGS. 8A to 8D has a L shaped opening to receive the distinguishing pin of the plugs it is to be understood that other configurations such as a right angled cross or a cross in which the arms of the cross are angled are contemplated by the invention.

An appliance which is equipped with the programmed microprocessor will require a low voltage DC supply in order to respond to the initial interrogating signal and to return information with respect to operational data. Since an important feature of closed loop programmable power is the safety feature associated with not having power at the socket until called for by an appliance, there is a requirement to generate low voltage power for the microprocessor before the main power is present. One of the techniques of satisfying this requirement is to superimpose a high frequency current limited AC voltage to the socket which provides a voltage to the plug when inserted. This high frequency AC voltage is then rectified by the circuit 90 shown in FIG. 9, the output 91, 92 being set at the DC voltage level required to operate the microprocessor in the appliance. Since the voltage is low, it does not pose a safety problem with respect to shock. Moreover, because the current is limited, fire hazard is not present.

Rather than having the low voltage current continuously present, i.e., superimposed on the normal current being conducted to the appliance by way of the electrical conductors, means could be provided to switch off this supplemental power once the normal current is being supplied and until the appliance is unplugged.

As an alternative, a low voltage current limited DC voltage could be made available at the socket which would serve to power a microprocessor once the appliance plug is inserted in the socket.

As a further embodiment, it is proposed that incident light energy derived from the interrogating signal could supply a photovoltaic cell which would power a the microprocessor and external modulator in the appliance, the modulator, which may be in the form of a Kerr cell, would then act on the incoming and refected light so as to provide the light signal being returned to the interface.

The description heretofore has referred to a power distribution cable including an integral optical fiber. For certain applications and in particular situations wherein only a communication link is required, instead of the integrated cable a single length of the optical fiber can be used.

As an example, an overhead lamp in a conventional application requires that a power cable be run to the light socket and to a switch mounted on the wall in order to turn on and off the lamp. In the present invention the power cable only need be connected to the socket in as much as the control signal is delivered by the optical fiber to the control interface which will arrange for power to be provided to the lamp socket. In this instance, the optical fiber can be inserted in the normal wall cavity, or since the optical fiber is of an extremely small diameter it could be unobtrusively placed on the surface of the wall. The optical fiber could be manufactured, for example, in combination with a very thin adhesive tape which could be applied directly to a wall face or other structural member.

Figure 10A:
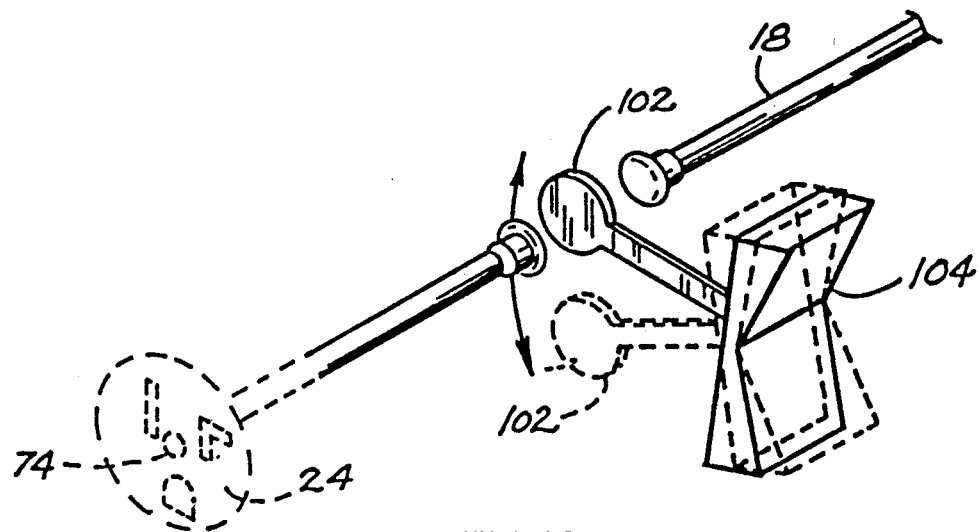
FIG. 10A illustrates an alternate switch.

An interrogating signal from the control interface is present on the fiber and if the interrogating signal is not reflected back to the interface, the lamp will not be energized. A switch which comprises a retroreflective surface as described hereinbefore, operational between a first position adjacent the end of the cable and a second position removed from the cable will serve to provide the return communication to the interface is illustrated in FIG. 10A. While the switch 100 is in a first position wherein the retroreflective surface 76 is not in communication with the optical fiber 18, the overhead lamp will not be energized. In the second position wherein the optic retroreflective surface 76 is adjacent the end of the fiber 18 then the interrogation light will be reflected and a message directed to the interface to provide power to the overhead light. In order to increase reliability while keeping acceptable manufacturing tolerance, it is believed preferable to provide a lens at the end of the fiber through which the light signals are transmitted from and reflected to the optical fiber.

As a further embodiment on this feature, a switch has been developed which will serve to de-energize an appliance which otherwise is activated by the closed loop programmable power system. In this instance, and as shown in FIG. 10B the communication fiber 18 is severed and lens couplers 74 as described hereinbefore are placed on the two severed ends. A narrow air gap remains between the couplers and an opaque film 102 carried by a switch mechanism 104 is arranged to move through the gap. When the opaque film is in between the lens couplers 74, the interrogation signal will be disrupted and the appliance deactivated. Removal of the opaque film 102 from the coupler 74 will allow normal interrogating signal to be fed through the communication link and the appliance re-energized.

The aspect of communicating command signals by means of an optical fiber also applies to communicating externally generated communication information within the building. As previously indicated the optical fiber distributed to the receptacles either in association with power distribution cables or individually may be used to transmit data such as audio and video signals, telephonic transmissions and monitoring information of various sources. In accordance with the invention each receptacle is capable of being accessed by a telephone set as well as the usual audio and video receivers. The communication signal which enters the building at the front end is coupled to communications converter means which converts the signal to a digitized or analog light signal. A device such as a laser used in compact disc applications may be used. At the receiver end the light signal which has travelled through the optical fiber is converted to an electrical signal by means of photo diode type device.

A further embodiment on this concept is illustrated in FIG. 11. In accordance with the closed loop programmable power concept with distributed communication capabilities power sockets are capable of providing external communication signals in addition to operational power. Thus, for example, a television which is plugged into a closed loop programmable socket will initially receive the prescribed operating voltage and subsequently an audio and video signal selected from the appropriate inputs. Since the optical fiber is capable of simultaneously transmitting a range of digitized signals, it is possible to transmit externally generated command signals on the communication link in addition to the audio and video signals. Hence, it is not only possible to provide a television signal at a particular socket but it is also possible to dictate which television channel is present and at which socket it will appear. The configurations shown in FIGS. 11A–11C are intended to be used to remotely provide control signals for this application. An adapter 110 (FIG. 11B) which may be plugged into the receptacle has a signal collecting device or detector 112 on the end opposite the plugs. The detector which may be in the form of a silicon solar cell receives an infrared signal from a signal selection generator 114 (FIG. 11A) and the signal will be carried on the communication link to the interface where the signal will direct the appropriate TV signal to the requested socket. Although it is anticipated that the signal is transmitted by an infrared light source such as a gallium arsenide light emitting diode, the optical coupling can also be completed by an optical fiber running directly from the signal selection generator 114 to the optical coupler of the receptacle. While the structure of the detector may be of an active nature in that it receives signals which are transmitted thereto in the form of sound, electrical or light and then converts them into digital or analog signals for transferring to the optical fiber, the detector may be more of a passive nature in that it is in the form of a lens or reflective surfaces, or both, for gathering light signals emitted from the generator and directing them to the coupler of the optical fiber in the receptacle (FIG. 11C).

The concept of closed loop programmable power with a two way communication link can be adapted to an almost unlimited number of applications found within a residential environment. For example, FIG. 12 illustrates an optical fiber communication link carried by a gas delivery conduit. When coupled, the fiber optic communication link will interrogate the gas requirement of the gas operated appliance and will couple the operational data to the control panel.

One of the results of this type of communication link is that information from a gas system or an oil system as in an oil furnace can be made available for external monitoring. With the system, it is contemplated that gas, oil or water requirements can be monitored and if an unusual demand on the services is detected, the appropriate service personnel will be advised.

The optical fiber communication link is also suitable for other forms of communication and monitoring services within a residence. For example, monitoring of room temperatures, child care and other health related conditions, smoke and heat detection for fire alarms, and various forms of intrusion detecting devices. Examples of intrusion detecting devices are shown in FIGS. 13, 14 and 15. In FIG. 13 a fiber optic 18 is attached to the surface of a glass window 130. A reflective surface 132 is provided at the end of the fiber and if the signal is returned no alarm will be sounded. If, however, the glass 130 is broken which disrupts the reflective surface 132, no signal will be returned to the interface and a command will be given to sound an alarm.

In FIGS. 14 and 14A, a optical fiber is held adjacent to a reflective surface which is positioned by means of a wire 142 which passes in front of a window 130. If the wire 142 is disturbed, the angle of the reflector 140 is altered and the reflected signal through the communication link disrupted. This will result in an alarm being generated in response to a command from the interface as in the previous case. Similarly, in FIGS. 15, and 15A an optical fiber 18 is secured adjacent to a reflective surface 150 at the edge of a door 152. If the door is opened by an intruder, the reflected signal will cease and the control interface 20 will command the appropriate alarm mechanism either within the building or at a remote monitor.

Although preferred embodiments of the invention have been described in detail it will be apparent to one skilled in the art that variations may be made thereto without departing from the scope of the invention as claimed hereinafter.

What is claim is:

1. A closed loop, programmable power and communication system for a building said system including a control interface means, a power source means, a plurality of receptacle means throughout the building at locations where power is required, means for supplying power form said power source means to said control interface means, and a plurality of power distribution cables extending one each from said control interface means to said receptacles, each cable including a pair of electrical power conductors and an optical fiber for transmitting light signals simultaneously in both directions between said control interface means and each receptacle, each receptacle including socket means for reception of a plug of an appliance, said socket having openings in a face thereof for matingly receiving prongs of said plug, and an optical coupler disposed in said face in the vicinity of said openings, said optical coupler communicating with the optical fiber of the cable extending to the receptacle and providing a signal receiving and transmitting means of the receptacle, said control interface means having means for transmitting optical signals to the optical fiber of each cable and receiving optical signals therefrom, switching means controlled by said control interface means in response to signals received thereby for controlling power flow from said power source to the power conductors of each cable, and means for continuously superimposing a low voltage and low current power supply on at least one of said pair of said electrical power conductors of each power distribution cable extending from said control interface means to each receptacle.

2. A system as defined in claim 1, wherein said superimposed power supply is of frequency higher than the normal power supplied to said each receptacle via said electrical power conductors.

3. A system as defined in claim 1, wherein the normal power supplied to the receptacle by said electrical power conductors is AC, and said superimposed power supply is DC.

4. A closed loop, programmable power and communication system for a building said, system including a control interface means, a power source means supplied from exterior of said building, a plurality of receptacle means throughout the building at locations where power is required, means for supplying power form said power source means to said control interface means, a plurality of power distribution cables extending one each from said contol interface means to said receptacles, said power source means having means for providing AC or DC power to said conductors including means for supplying power form said power source means to said control interface means, each cable including a pair of electrical power conductors and an optical fiber for transmitting light signals simultaneously in both directions between said control interface means and each receptacle, each receptacle including socket means for reception of a plug of an appliance, said socket having openings in a face thereof for matingly receiving prongs of said plug, and an optical coupler disposed in said face in the vicinity of said openings, said optical coupler communicating with the optical fiber of the cable extending to the receptacle and providing a signal receiving and transmitting means of the recepacle, said control interface means having means for transmitting optical signals to the optical fiber of each cable and receiving optical signals therefrom, and switching means controlled by said control interface means in response to signals received thereby for controlling power flow from said power source to the power conductors of each cable.

5. A closed loop, programmable power and communication system for a building, said system including a control interface means, a power source means, a plurality of receptacle means throughout the building at locations where power is required, means for supplying power form said power source means to said control interface means, and a plurality of power distribution cables extending one each from said contol interface means to said receptacles, each cable including a pair of electrical power conductors and an optical fiber for transmitting light signals simultaneously in both directions between said control interface means and each receptacle, each receptacle including socket means for reception of a plug of an appliance, said socket having openings in a face thereof for matingly receiving prongs of said plug, and an optical coupler disposed in said face in the vicinity of said openings, said optical coupler communicating with the optical fiber of the cable extending to the receptacle and providing a signal receiving and transmitting means of the recepacle, said control interface means having means for transmitting optical signals to the optical fiber of each cable and receiving optical signals therefrom, switching means controlled by said control interface means in response to signals received thereby for controlling power flow from said power source to the power conductors of each cable, a conduit for transferring fluid within said building, and outlet means for said conduit and including mechanical coupler means for connecting said conduit to other conduits, said conduit including an optical fiber extending therealong and being provided with an optical coupler at said outlet means for alignment with an optical coupler in said other conduits, said optical fiber in said conduit being in communication with said control interface means for controlling the flow of fluid therethrough.

6. A system as defined in claim 5, wherein said conduit is a gas supply conduit, said outlet means supplying gas to gas consuming appliances, said coupler means being connectable to a coupler of a conducting hose of said appliance, said coupler of said hose including an optical coupler, and optical fiber extending from said hose coupler to said appliance and thus placing said gas appliance in communication with said control interface means.

7. An appliance for use in a building having a closed loop, programmable power and communication system, the system having receptacles connected to a power source through a control interface means by cables of a type including electrical power conductors and a single optical fiber for transmitting communication signals between said receptacle and said control interface means, said appliance including a microprocessor storing a permanent memory containing operational information of said appliance, means for receiving power transmitted to said receptacle in the form of a low voltage power superimposed on said power conductors, said power operating said microprocessor, means for receiving an interrogating signal transmitted to said receptacle from said control interface means via said optical fiber, and means for transmitting from said appliance to said receptacle signals indicative of said information for communication via said optical fiber to said control interface means.

8. The appliance of claim 7, wherein said appliance includes means for receiving digitized or analog light signals via said optical fiber from said control interface means and converting said light signals for use in the function of said appliance.

9. The appliance of claim 8, wherein said light signals are converted to produce an audio and/or video output of said appliance.

10. The appliance of claim 7, and further including means for converting signals produced in a function of said appliance to a digitized or analog optical signals for transmitting via said optical fiber to said control interface.

11. An electrical socket means for reception of a plug of an appliance, said socket means being adapted for use in a closed loop, programmable, power and communication system, the system having receptacles connected to a power source through a control interface means by cables of the type including a pair of electrical power conductors and an optical fiber for transmitting communication signals between said receptacles and said control interface means; said socket means being adapted to form part of said receptacle and having an exposed face defining a pair of slotted openings for reception of prongs of a conventional plug of an appliance to provide electrical connection between said electrical cables and said prongs, a first optical coupler in said face in the vicinity of said openings for transmitting light signals from and sending light signals to said optical fiber of the cable extending thereto, said first optical coupler being disposed for alignment with a second optical coupler in a non-conventional plug of an appliance adapted to receive and/or transmit signals to said control interface means via said optical cable, and a retro-reflective means on said conventional plug for alignment with said first optical coupler when said conventional plug is received in said socket means.

12. The socket means of claim 11, wherein said retro-reflective means is a flat element having a retro-reflective surface on a front side thereof and adhesive means on a rear side thereof for attachment to said conventional plug.

13. A switch means for use in a closed loop, programmable power and communication system for a building, said system including a power source means, a control interface means, means for providing power communication between said power source and control interface means, a plurality of receptacle means throughout the building at locations where power is required, a plurality of power distribution cables extending one each from said control interface means to said receptacles, and an optical fiber extending from the control interface means to each receptacle for transmitting light signals simultaneously in both directions between said control interface means and each receptacle, each receptacle having a signal receiving and transmitting means in communication with said optical fiber extending thereto, and said control interface means having means for continuously transmitting signals to the optical fiber of each cable and receiving signals therefrom, and means controlled by said control interface means in response to signals received thereby for separately controlling power flow from said power source to each cable; said switch means including means for receiving and end of an optical fiber having the opposite end thereof connected to said control interface means for receiving a continuous interrogative signal therefrom, a manually activated member movable between two positions, and a retroreflective element connected to said member and movable on movement of said member between the two positions from a position facing said end of said optical fiber to a position away from the end of said optical fiber, said element in said facing position reflecting said interrogative signal into the end of said optical cable, whereby said control interface means is informed of the movement of said member between the two positions.

14. A switch means according to claim 13, and further including a lens disposed at the end of said optical fiber in said switch means.

15. A switch means for use in a closed loop, programmable power and communication system for a building, said system including a power source means, a control interface means, a plurality of receptacle means throughout the building at locations where power is required, and a plurality of power distribution cables extending one each from said power source through said control interface means to said receptacles and including a pair of electrical power conductors, an optical fiber extending from said control interface means to each receptacle for transmitting light signals simultaneously in both directions between said control interface means and each receptacle, each receptacle having a signal receiving and/or transmitting means in communication with said optical fiber extending thereto, said control interface having means for continuously transmitting signals to the optical fiber and receiving signals therefrom, and means controlled by said interface in response to signals received thereby for controlling power flow from said power source to the power conductors of each cable; said switching means including means for receiving ends of a pair of optical fibers one of which has an opposite end thereof connected to said control interface for receiving a continuous interrogative signal therefrom, said ends of said optical fibers terminating in said switch in a pair of spaced lenses capable of transmitting light signals therebetween, a manually activated member movable between two positions, and an obscuring element connected to said member and movable on movement of said member between the two position from a position between said lenses to a position away from said lenses whereby the travel of said interrogative signal through said switch means can be selectively interrupted.

16. An electrical socket means for reception of a plug of an appliance, said socket means being adapted for use in a closed loop, programmable power and communication system, the system having receptacles connected to a power source through a control interface means by cables of a type including a pair of electrical power conductors and a single optical fiber for transmitting communication signals between said receptacles and said control interface means; said socket means being adapted to form part of said receptacle and having an exposed face defining a pair of parallel slotted openings for reception of prongs of a conventional plug of an appliance to provide electrical contact between said electrical cables and said prongs, and an optical coupler in said face in the vicinity of said openings for transmitting light signals from and sending light signals to said optical fiber of the cable, said coupler including a collimating lens disposed for alignment with a collimating lens of a coupler means in a non-conventional plug of an appliance adapted to receive and/or transmit signals to said interface means via said optical cable.

17. An electrical socket means for reception of a plug of an appliance, said socket means being adapted for use in a closed loop, programmable power and communication system, the system having receptacles connected to a power source through a control interface means by cables of a type including a pair of electrical power conductors and a single optical fiber for transmitting communication signals between said receptacles and said control interface means; said socket means being adapted to form part of said receptacle and having an exposed face definition a pair of parallel slotted openings for reception of prongs of a conventional plug of an appliance to provide electrical contact between said electrical cables and said prongs, an optical coupler in said face in the vicinity of said openings for transmitting and sending light signals to said optical fiber of the cable extending thereto, said optical coupler including a collimating lens disposed for alignment with a collimating lens of a coupler means in a non-conventional plug of an appliance adapted to receive and/or transmit signals to said control interface means via said optical cable, and a retro-reflective means for attachment to said conventional plug for alignment with said optical coupler when said prong of said conventional plug is received in said slotted opening of said exposed face of said receptacle.

18. The socket means of claim 17, wherein the coupler in said face and the coupler means of the non-conventional plug comprises a pair of lenses arranged to come face-to-face and be disposed substantially on a common axis when the non-conventional plug is received in said socket means.

19. The socket means of claim 18, wherein the axis of said lenses is slightly angled relative to a line normal to said face whereby accidental reflection into said coupler in said face from a mirror type object placed in front of said face is avoided.

20. The socket means of claim 18, wherein the lenses have a focal length in the range of ⅛ to 3 mm.

21. The socket means of claim 18, wherein the lenses have a focal length of approximately 1 mm.

22. The socket means of claim 17, wherein said retroreflective means is in the form of a material consisting of a plurality of closely spaced retroreflective elements.

23. The socket means of claim 22, wherein each retroreflective element has a maximum dimension in the range of 25μ to 300μ.

24. The socket means of claim 22, wherein each retroreflective element has a maximum dimension of approximately 100μ.

* * * * *